United States Patent
Caroli

(10) Patent No.: US 7,412,998 B2
(45) Date of Patent: Aug. 19, 2008

(54) SEALING DEVICE FOR SEALING AND SIMULTANEOUSLY CUTTING A WEB OF MATERIAL

(75) Inventor: Rodolfo Caroli, Imola (IT)

(73) Assignee: I.M.A. Industrie Macchine Automatiche S.p.A., Bologna (IT)

( * ) Notice: Subject to any disclaimer, the term of this patent is extended or adjusted under 35 U.S.C. 154(b) by 378 days.

(21) Appl. No.: 10/533,131

(22) PCT Filed: Apr. 6, 2004

(86) PCT No.: PCT/IB2004/001252

§ 371 (c)(1),
(2), (4) Date: Apr. 29, 2005

(87) PCT Pub. No.: WO2004/091894

PCT Pub. Date: Oct. 28, 2004

(65) Prior Publication Data

US 2006/0042758 A1    Mar. 2, 2006

(30) Foreign Application Priority Data

Apr. 18, 2004 (EP) .................. 03425245

(51) Int. Cl.
*B32B 37/00* (2006.01)
(52) U.S. Cl. ............... 156/515; 156/73.3; 156/530; 156/580.2
(58) Field of Classification Search ............ 156/73.1, 156/73.3, 510, 515, 530, 580.1, 580.2
See application file for complete search history.

(56) References Cited

U.S. PATENT DOCUMENTS 5,665,196 A    9/1997    Combe et al.

FOREIGN PATENT DOCUMENTS

JP    03261540    * 11/1991

* cited by examiner

*Primary Examiner*—James Sells
(74) *Attorney, Agent, or Firm*—Arent Fox LLP

(57) ABSTRACT

The present invention relates to a sealing device for making a longitudinal seal on and simultaneously trimming the excess material from a web of material during the formation of a continuous tubular wrapping of filter paper in a station forming part of an automatic machine for making filter bags containing infusion products such as tea or coffee.

6 Claims, 2 Drawing Sheets

SEALING DEVICE FOR SEALING AND SIMULTANEOUSLY CUTTING A WEB OF MATERIAL

CROSS-REFERENCE TO RELATED APPLICATION

This application is a National Stage entry of International Application No. PCT/IB2004/001252, filed Apr. 6, 2004, the entire specification claims and drawings of which are incorporated herewith by reference.

TECHNICAL FIELD

The present invention relates to a sealing device for sealing and simultaneously cutting a web of material.

In particular, the sealing device according to the invention is advantageously used to make a longitudinal seal on and simultaneously trim the excess material from a continuous tubular wrapping made from a web of material.

The tubular wrappings concerned are those made from filter paper in an automatic machine for making filter bags such as, for example, bags containing infusion products such as tea or coffee.

BACKGROUND ART

Prior art machines for making filter bags from a web of filter paper comprise a plurality of stations, including a station for feeding a web of filter paper, a folding station and a first station for longitudinally sealing the folded web to form a continuous tubular wrapping of filter paper and preferably for transversally sealing the continuous tubular wrapping to form a succession of filter bags of substantially flattened shape.

The longitudinal and transversal sealing station may comprise a specially shaped upper roller with tracks for longitudinally and transversally sealing the continuous tubular wrapping of filter paper. The seals may be made by heat sealing means or, in the solutions of the latest generation, by sonotrodes, positioned in contact with the product to be sealed.

The sonotrode is the transducer element that converts the power supply into vibrations that are discharged onto the product to be sealed.

Prior art sealing devices, however, present some disadvantages linked to the fact that the edge of the product, after being sealed, is irregular and therefore requires trimming, that is to say, an additional cutting operation to obtain a straight, regular edge.

This constitutes a particularly serious drawback at high production speeds when it is even more difficult to guarantee a regular seal, and especially in cases where the quality of the sealed finish has a significant commercial value.

A first aim of the present invention is to provide an ultrasound sealing device that overcomes the above mentioned disadvantages.

A second aim of the invention is to reduce the number of separate steps required to obtain a finished product, for example, in the production of bags from a web of material, whether tubular or not.

DISCLOSURE OF THE INVENTION

These aims are achieved by a device according to the main claim appended hereto.

The advantages of the device according to the invention lie essentially in the fact that it produces a continuous tubular web that is sealed by ultrasounds and cut along at least one longitudinal edge in a single step.

DESCRIPTION OF THE DRAWINGS

Specifically, the sealing device is an ultrasound sealing device, to which this specification refers but without thereby restricting the scope of the inventive concept, described with reference to two preferred embodiments illustrated in the accompanying drawings in which.

DETAILED DESCRIPTION OF THE PREFERRED EMBODIMENTS OF THE INVENTION

Figure 3:
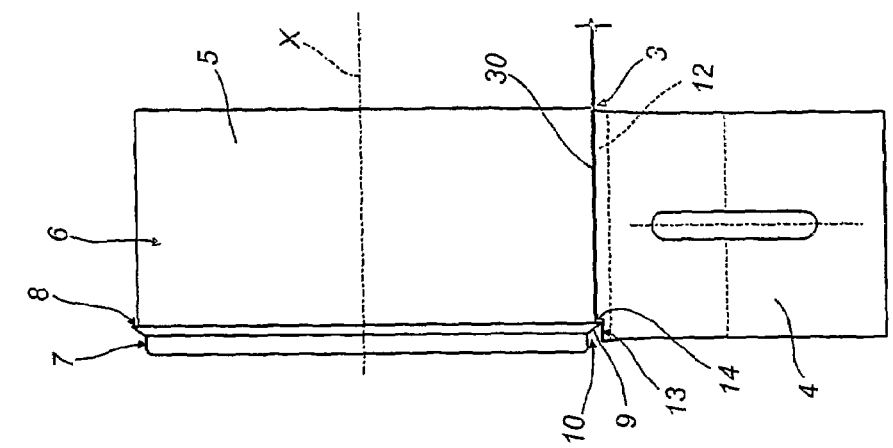
FIG. 3 is a cross section through a vertical plane of a second preferred embodiment of the sealing device according to the invention.

With reference to the accompanying drawings, the numeral 1 denotes a sealing device for simultaneously sealing and cutting a web of material 2.

Specifically, the web 2 is folded onto itself into a U shape to form a continuous tubular wrapping 3 initially open along one longitudinal edge 30.

The device 1 comprises an ultrasound wave emitter 4, or sonotrode 4, which is designed to move towards the web 2 in a direction Y, preferably vertical, and to act on the latter through a vibrational effect in conjunction with a suitable contact element.

The contact element may consist, for example, of a revolving contact roller 5 positioned tangentially to the sonotrode 4 so as to seal the tubular wrapping 3 longitudinally (direction D) and simultaneously cut it, also longitudinally.

During the sealing and cutting operation, the tubular web 3 is fed continuously, in a flattened configuration, between the sonotrode 4 and the contact roller 5 in the longitudinal feed direction D, preferably horizontal.

By way of non-restricting example, FIGS. 1 to 4 illustrate cutting and sealing of the tubular wrapping 3 along its longitudinal edge 30, originally open, but it will be understood that the device according to the invention may be applied to any part of a web to be sealed and cut.

Figure 2:
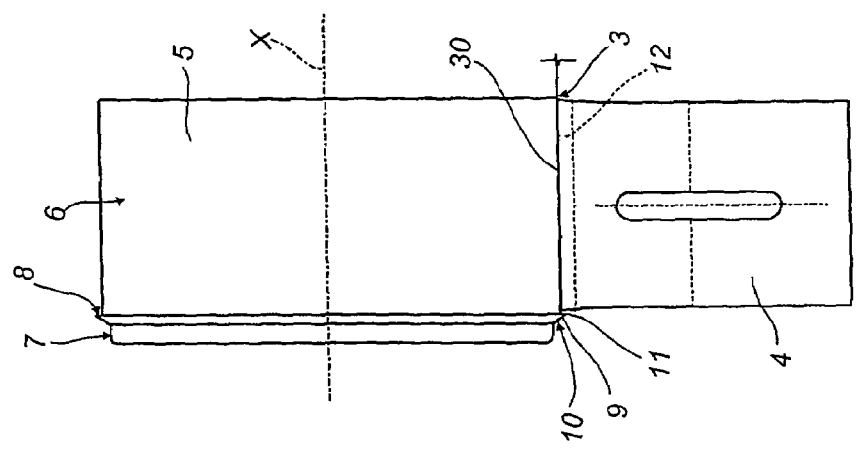
FIG. 2 is a cross section through a vertical plane A-A of the device of FIG. 1.
Figure 1:
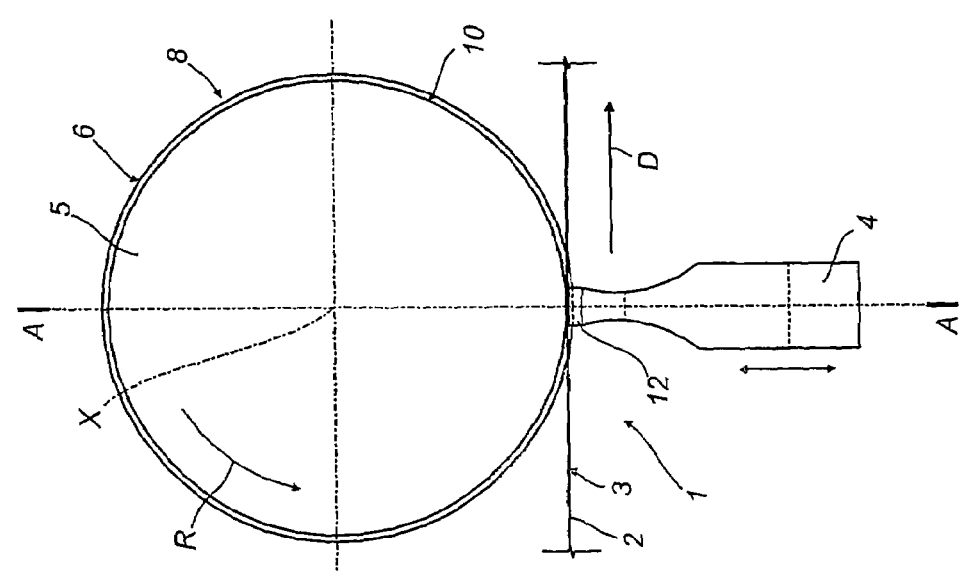
FIG. 1 is a schematic front view, with some parts cut away for clarity, of a first preferred embodiment of the sealing device according to the invention.
Figure 4:
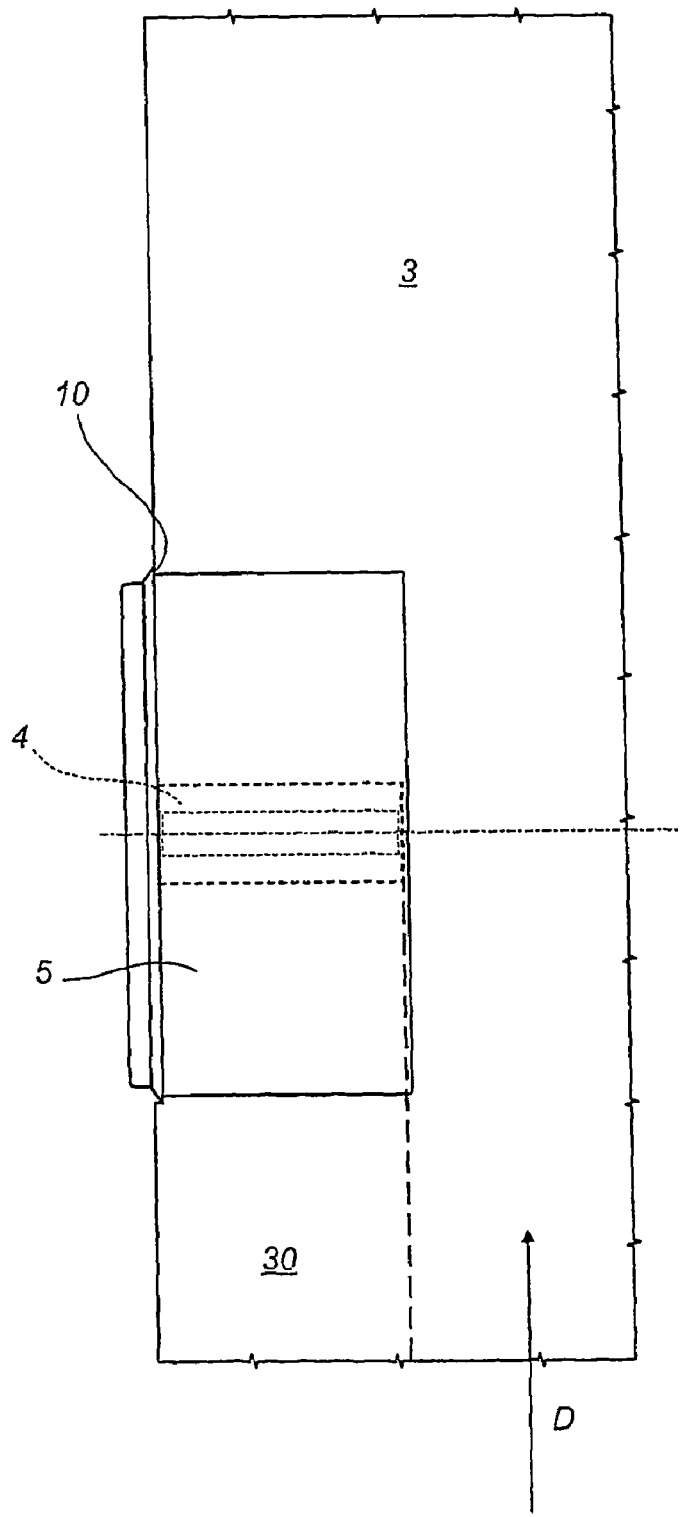
FIG. 4 is a top view of a part of the device of FIG. 1 for sealing and cutting a longitudinal edge of a web of material.

As illustrated in FIGS. 1 and 2, the roller 5 is made to rotate about its central axis X positioned transversally to the direction D, in anticlockwise direction of rotation R, indicated in FIG. 1, and comprises a substantially cylindrical surface 6, which at at least one end 7 has a substantially wedge-shaped annular protuberance 8 protruding radially from the surface 6 itself and one sharp edge 9 of which forms a cutting surface 10.

The cutting surface 10 is designed to act in conjunction with a matching cutting edge 11 made laterally at the sealing end 12 of the sonotrode 4 so that as the roller 5 revolves and the web 2 is fed longitudinally, it creates a scissor effect that cuts off the parts in excess or trimmings 31 from the tubular wrapping 3.

According to the invention, the cut is performed at the same time as a longitudinal seal is made by ultrasounds in the contact region between the sealing end 12 of the sonotrode 4 and the contact surface 6 of the cylinder 5, at the parts in excess, or trimmings 31 of the tubular wrapping 3 which are placed against each other along the longitudinal edge 30.

The parts in excess or trimmings 31 of the tubular web 3 cut off by the scissor effect are extracted by customary means (not illustrated) such as, for example, suction means or the like.

In the embodiment illustrated in FIG. 3, the sealing end 12 of the sonotrode 4 has on one side of it a step 13, preferably with a quadrangular cross section, one edge 14 of which is sharp and designed to cut off in scissor-like manner the parts in excess or trimmings 31 of the tubular wrapping 3 by acting in conjunction with the aforementioned cutting surface 10 of the contact roller 5, again simultaneously with the application of the seal along the longitudinal edge of the wrapping 3 itself.

The present invention has been described with reference to preferred embodiments of it, in particular for sealing and cutting an open longitudinal edge 30 of a tubular web 3 fed continuously.

The device according to the invention may, however, be applied to different configurations, as for example, to seal and cut a web of material transversally to its longitudinal direction of feed D.

Similarly, the device might be used to simultaneously seal and cut parts o separate items, that is to say, items that are not fed continuously.

It will be understood that the invention can be modified and adapted in several ways without thereby departing from the scope of the inventive concept. Moreover, all the details of the invention may be substituted by technically equivalent elements.

The invention claimed is:

1. A device for sealing a web of material, comprising means for emitting ultrasonic radiation, and a contact roller acting in conjunction with the emitting means in a sealing area, the contact roller being equipped with at least one cutting surface designed to interact with a matching cutting edge of a sealing end of the emitting means so as to simultaneously seal and cut the web of material, wherein said cutting surface is defined by a sharp edge of a protuberance of the peripheral surface of the contact roller, and wherein said cutting surface of the contact roller and said matching cutting edge of the sealing end of the emitting means create a scissors effect that cuts off the parts in excess or trimmings from the sealed web when the web is advanced longitudinally and the contact roller is revolved.

2. The device according to claim 1, characterised in that the cutting surface of the emitting means consists of a sharp cutting edge of the sealing end.

3. The device according to claim 2, characterised in that the cutting surface of the means consists of a sharp cutting edge of a stepped surface of the sealing end.

4. The device according to claim 3, characterised in that the stepped surface has a quadrangular cross section.

5. The device according to claim 1, characterised in that the cutting surface of the emitting means consists of a sharp cutting edge of a stepped surface of the sealing end.

6. The device according to claim 5, characterised in that the stepped surface has a quadrangular cross section.

* * * * *

UNITED STATES PATENT AND TRADEMARK OFFICE
CERTIFICATE OF CORRECTION

PATENT NO. : 7,412,998 B2
APPLICATION NO. : 10/533131
DATED : August 19, 2008
INVENTOR(S) : Rodolfo Caroli It is certified that error appears in the above-identified patent and that said Letters Patent is hereby corrected as shown below:

Title Page:

Item (73) Assignee:

Please delete

"I.M.A. INDUSTRIE MACCHINE AUTOMATICHE S.p.A."

And insert

-- I.M.A. INDUSTRIA MACCHINE AUTOMATICHE S.p.A. --

Item (30) Foreign Application Priority Data:

Please delete

"April 18, 2004"

And insert

-- April 18, 2003 --

Signed and Sealed this

Tenth Day of March, 2009

JOHN DOLL
*Acting Director of the United States Patent and Trademark Office*